US007792159B2

(12) United States Patent
Itou et al.

(10) Patent No.: US 7,792,159 B2
(45) Date of Patent: Sep. 7, 2010

(54) MULTIPLEXING DEVICE AND DATA PROCESSING METHOD THEREOF

(75) Inventors: Hironori Itou, Tokyo (JP); Kazuhiro Koyama, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 847 days.

(21) Appl. No.: 11/328,115

(22) Filed: Jan. 10, 2006

(65) Prior Publication Data

US 2006/0153249 A1 Jul. 13, 2006

(30) Foreign Application Priority Data

Jan. 11, 2005 (JP) ............................. 2005-004217

(51) Int. Cl.
*H04J 3/02* (2006.01)

(52) U.S. Cl. ...................................... 370/537

(58) Field of Classification Search .................. 370/464, 370/498, 537
See application file for complete search history.

(56) References Cited

U.S. PATENT DOCUMENTS

| 7,327,791 | B1 * | 2/2008 | Sekiguchi et al. ...... 375/240.27 |
| 2002/0016852 | A1 * | 2/2002 | Nishihara .................... 709/236 |
| 2004/0106402 | A1 * | 6/2004 | Lin ............................ 455/424 |
| 2004/0146218 | A1 * | 7/2004 | Tinn et al. .................... 382/284 |

FOREIGN PATENT DOCUMENTS

| EP | 0 833 471 A1 | 4/1998 |
| EP | 0 935 363 A1 | 8/1999 |
| EP | 0935363 A1 * | 8/1999 |
| GB | 2 365 713 A | 2/2002 |
| JP | 11-088301 A | 3/1999 |
| JP | 2002-152730 A | 5/2002 |

OTHER PUBLICATIONS

Leon-Garcia, Leon and Widjaja, Ingrid, Communication Networks, 2003, McGraw Hill, 2nd Edition, pp. 674-688.*
Lindbergh D: "The H.324 Multimedia Communication Standard" IEEE Communications Magazine, IEEE Service Center, New York, NY, US, vol. 34, No. 12, Dec. 1996, pp. 46-51, XP000636453, ISSN: 0163-6804.
Iskander C-D et al: "Comparison of Standards and Techniques for Circuit-Switched Versus Packet-Switched H.26X Video Communications Over CDMA Mobile Networks" Proceedings of the Wireless Communications, Jul. 2002, XP007900014.

(Continued)

*Primary Examiner*—Derrick W Ferris
*Assistant Examiner*—Omar Ghowrwal
(74) *Attorney, Agent, or Firm*—Sughrue Mion, PLLC

(57) ABSTRACT

The multiplexing device includes a data conversion unit which receives input of at least one of a plurality of pieces of data and executes segmentation or concatenation processing with respect to the data as required to output data which fails to exceed a predetermined limited size and which is delimited by a delimitation of a predetermined data unit, a plurality of adaptation units which are disposed in plural corresponding to the plurality of pieces of data and output data from the data conversion unit to provide the corresponding data with a function of an adaptation layer according to properties of the data, and a multiplexing layer unit which multiplexes a plurality of pieces of data from the plurality of adaptation units and sends out the multiplexed data.

12 Claims, 6 Drawing Sheets

OTHER PUBLICATIONS

International Telecommunication Union Itu: "Series H: Audiovisual and Multimedia Systems: Infrastructure of audiovisual services—Transmission multiplexing and synchronization. Multiplexing protocol for low bit rate multimedia communication. ITU-T Recommendation H.223" ITU-T Recommendation H.223, vol. H.223, Jul. 29, 2001, XP002369896.

"Digital cellular telecommunications system (Phase 2-0; Universal Mobile Telecommunications System (UMTS); Codec for Circuit switched Multimedia Telephony Service; Modifications to H.324 (3GPP TS 26.111 version 6.1.0 Release 6); ETSI TS 126 111" ETSI Standards, European Telecommunications Standards Institute, Sophia-Antipo, FR, vol. 3-SA4, No. V610, Dec. 2004, XP014027731.

* cited by examiner

FIG. 4

|  | CONVENTIONAL ART | EMBODIMENT |
|---|---|---|
| ADAPTATION LAYER | AL1-PDU　　　10<br>AL2-PDU　　　33<br>AL3-PDU　　(202,) 42 | 10<br>33<br>116, 128 |
| MULTIPLEXED LAYER | (1)+10+33+(116)= 160[T1]<br>(1)+　　　(86)= 87[T2]<br>(1)+　　　 42 = 43[T2] | (1)+10+33+116 = 160[T1]<br>(1)+　　　128 = 129[T2] |
| TOTAL | 290(311) | 289(303) |

MUX-PDU HEADER

MUX-PDU HEADER

MULTIPLEXING DEVICE AND DATA PROCESSING METHOD THEREOF

BACKGROUND OF THE INVENTION

1. Field of the Invention

The present invention relates to a multiplexing device which multiplexes a plurality of pieces of data applied.

2. Description of the Related Art

Various standards related to multimedia communication have been specified so far. ITU-T Recommendation H.324, for example, defines a system and a terminal device for multimedia communication using an analog channel. Also specified are Standard H.324/M for a mobile channel switched network and Standard 3G-324M for an advanced mobile communication network.

In these standards, Standard H.223 is specified as a system for multiplexing control data, voice coding data and image coding data into a single stream.

Standard H.223 provides a logical channel for each of voice data, image data and control data to enable QoS (Quality of Service) control for each logical channel.

For H.324/M and 3G-324M, the system which has improved transmission error resistance of Standard H.223 is specified by Standard H.223 Annex A,B,C.

Based on such standards, systems and the like for multiplexing voice data, image data and control data have been proposed (see e.g. Japanese Patent Laying-Open No. 2002-152730) and developed.

Common multiplexing device according to conventional art which can be expected from ITU-T Recommendation H.223 will be described.

FIG. 6 is a block diagram showing a structure of a common multiplexing device. With reference to FIG. 6, the common multiplexing device includes a multiplexing parameter control unit 103, a control data adaptation unit 104, a voice data adaptation unit 105, an image data adaptation unit 106 and a multiplexing layer unit 107.

The multiplexing device shown in FIG. 6 is a device which multiplexes coded image and voice into a single stream. To the present multiplexing device, applied other than image data 102 which is a coded image and voice data 101 which is coded voice are control data 100 as control information related to a coding system or a multiplexing system of voice and images.

The control data 100 is input to the control data adaptation unit 104, the voice data 101 is input to the voice data adaptation unit 105 and the image data 102 is input to the image data adaptation unit 106.

The multiplexing parameter control unit 103 assigns each of the control data adaptation unit 104, the voice data adaptation unit 105 and the image data adaptation unit 106 its maximum AL-SDU (Adaptation Layer-Service Data Unit) size.

AL-SDU is an SDU of an adaptation layer and a maximum AL-SDU size is a parameter which specifies a maximum size of an AL-SDU. Assume that a maximum AL-SDU size of the control data adaptation unit 104 is a maximum AL1-SDU size, a maximum AL-SDU size of the voice data adaptation unit 105 is a maximum AL2-SDU size and a maximum AL-SDU size of the image data adaptation unit 106 is a maximum AL3-SDU size.

The multiplexing parameter control unit 103 assigns the multiplexing layer unit 107 a maximum MUX-PDU (Multiplex-Protocol Data Unit) size.

MUX-PDU is a PDU in a multiplexed layer and a maximum MUX-PDU size is a parameter which specifies a maximum size of an MUX-PDU.

The control data adaptation unit 104, the voice data adaptation unit 105 and the image data adaptation unit 106 provide a function of an adaptation layer according to properties of each data.

The control data adaptation unit 104 generates an AL-PDU (AL1-PDU) which stores applied control data 100 and sends the same to the multiplexing layer unit 107. At this time, when the size of the input control data 100 is equal to or smaller than the maximum AL1-SDU size, the control data adaptation unit 104 takes the control data 100 as an AL-SDU (AL1-SDU) without processing. When the size of the control data 100 is larger than the maximum AL1-SDU size, the control data adaptation unit 104 segments the control data 100 on a maximum AL1-SDU size basis to take each segmented data as the AL1-SDU. As to the control data, no additional information exists, so that the AL1-SDU is as it is taken as the AL1-PDU.

The voice data adaptation unit 105 generates an AL-PDU (AL2-PDU) which stores applied voice data 101 and sends the same to the multiplexing layer unit 107. At this time, when the size of the input voice data 101 is equal to or smaller than the maximum AL2-SDU size, the voice data adaptation unit 105 takes the voice data 101 as an AL-SDU (AL2-SDU) without processing. When the size of the voice data 101 is larger than the maximum AL2-SDU size, the voice data adaptation unit 105 segments the voice data 101 on a maximum AL2-SDU size basis to take each segmented data as the AL2-SDU. As to the voice data, a sequence number and a CRC (Cyclic Redundancy Check) code are attached to the AL2-SDU as required to have the AL2-PDU. Sequence number is a number indicative of the order of data and a CRC code is a code for use in detecting a bit error.

The image data adaptation unit 106 generates an AL-PDU (AL3-PDU) which stores applied image data 102 and sends the same to the multiplexing layer unit 107. At this time, when the size of the input image data 102 is equal to or smaller than the maximum AL3-SDU size, the image data adaptation unit 106 takes the image data 102 as an AL-SDU (AL3-SDU) without processing. When the size of the image data 102 is larger than the maximum AL3-SDU size, the image data adaptation unit 106 segments the image data 102 on a maximum AL3-SDU size basis to take each segmented data as the AL3-SDU. As to the image data, a sequence number and a CRC code are attached to the AL3-SDU as required to have the AL3-PDU.

The multiplexing layer unit 107 multiplexes the AL1-PDU from the control data adaptation unit 104, the AL2-PDU from the voice data adaptation unit 105 and the AL3-PDU from the image data adaptation unit 106 and attaches an MUX-PDU header to the multiplexed data to generate an MUX-PDU and output the same as multiplexed data 108. At this time, the multiplexing layer unit 107 segments the AL-PDU as required such that the size of the MUX-PDU is within the maximum MUX-PDU size. With a plurality of multiplexing tables for use in multiplexing prepared in advance, the multiplexing layer unit 107 uses any of the multiplexing tables for the multiplexing processing.

MUX-PDU header is formed of a PM (Packet Marker), an MC (Multiplex Code) and an HEC (Header Error Control). PM indicates whether a last byte of an AL-SDU is included or not. MC indicates a multiplexing table used. HEC is information for detecting an error in an MUX-PDU header.

With a common multiplexing device, a size of data which can be processed is limited due to constraints on hardware and the like. In general, however, the image data 102 has a larger size than those of the control data 100 and the voice data 101, so that the image data 102 whose size exceeds the upper limit might be applied in some cases. In such a case, the image data 102 should be segmented or abandoned. When the data is abandoned, it is impossible to properly multiplex applied data.

In addition, while the image data 102 is in general input on a VP (Video Packet) basis or a segmented data basis, if the multiplexing device simply segments the image data 102 irrespectively of a delimitation of a VP, the delimitation of the VP goes out of order to prevent proper decoding of multiplexed image data.

SUMMARY OF THE INVENTION

An object of the present invention is to provide a multiplexing device capable of properly handling applied image data even when the applied data has a large size or the data is applied with a data unit segmented.

According to one aspect of the invention, s multiplexing device which receives input of a plurality of pieces of data and multiplexes the same, comprises a data conversion unit which receives input of at least one of said plurality of pieces of data and executes segmentation or concatenation processing with respect to the data as required to output data which fails to exceed a predetermined limited size and which is delimited by a delimitation of a predetermined data unit, a plurality of adaptation units which are disposed in plural corresponding to said plurality of pieces of data and output data from said data conversion unit to provide corresponding said data with a function of an adaptation layer according to properties of the data, and a multiplexing layer unit which multiplexes a plurality of pieces of data from said plurality of adaptation units and sends out the multiplexed data.

According to the present invention, since a data conversion unit segments or concatenates applied data such that the data fails to exceed a predetermined limited size and such that the data is delimited by a delimitation of a data unit and sends the obtained data to an adaptation unit, even when data of a large size is applied to the multiplexing device, sending of image data whose size exceeds a processing capacity to the adaptation unit or a multiplexing layer unit can be prevented and a delimitation on a data unit basis can be maintained to enable the data to be properly handled.

In the preferred construction, when a termination of said data is a termination of a predetermined data unit and the size of said data is smaller than said limited size, said data conversion unit outputs applied said data to corresponding said adaptation unit without executing segmentation or concatenation processing with respect to said data.

In another preferred construction, when a termination of said data is a termination of a predetermined data unit and the size of said data is larger than said limited size, said data conversion unit segments said data by said limited size to output said data up to a part including said termination to said adaptation unit.

In another preferred construction, when a termination of said data is not a termination of a predetermined data unit and the size of said data is larger than said limited size, said data conversion unit segments said data by said limited size to output the obtained data to said adaptation unit.

In another preferred construction, when the size of data remaining after segmentation of said data is smaller than said limited size, said data conversion unit holds said remaining data without outputting the same to said adaptation unit.

In another preferred construction, when a termination of said data is not a termination of a predetermined data unit and the size of said data is smaller than said limited size, said data conversion unit holds said data as remaining data without outputting the same to said adaptation unit.

In another preferred construction, said data conversion unit, when a termination of said data is not a termination of a predetermined data unit and the size of said data is larger than said limited size, segments said data by said limited size to output the obtained data to said adaptation unit, and when the size of data remaining after segmentation of said data is smaller than said limited size, holds said remaining data without outputting the same to said adaptation unit, and when a termination of said data is not a termination of the predetermined data unit and the size of said data is smaller than said limited size, holds said data as remaining data without outputting the same to said adaptation unit.

In another preferred construction, said plurality of adaptation units, when said data larger than a preset first maximum size is applied, provide a function of cutting out said data by said first maximum size and outputting the cut-out data as a function of said adaptation layer.

In another preferred construction, said adaptation unit corresponding to data output from said data conversion unit, when a third maximum size obtained by subtracting the size of data output from other said adaptation unit and the size of a header attached by said multiplexing layer unit from a second maximum size allowable as output data of said multiplexing layer unit is not more than said first maximum size set at said adaptation unit, provides a function of cutting out said data by said third maximum size as a function of said adaptation layer.

According to the present invention, since at the time of segmenting data by the adaptation unit, the data is cut out into an appropriate size based on a data size of other adaptation unit and an allowable size of the multiplexing layer unit, multiplexing efficiency can be improved.

In another preferred construction, at said data conversion unit, said first maximum size at the corresponding adaptation unit or a value of a positive integral multiple of the size is set as said limited size.

According to the present invention, since the data conversion unit adjusts applied data to have a first maximum size or a positive integral multiple of the size and sends the adjusted data to the adaptation unit and the adaptation unit uses the first maximum size for cutting out the data, data segmentation can be executed more efficiently to improve multiplexing efficiency.

In another preferred construction, said plurality of pieces of data include image data, voice data and control data and said data conversion unit is provided for said image data.

In another preferred construction, said predetermined data unit is a Video Packet.

According to the present invention, since the data conversion unit segments or concatenates applied data such that the data fails to exceed a predetermined limited size and such that the data is delimited by a delimitation of a data unit and sends the obtained data to the adaptation unit, even when data of a large size is applied to the multiplexing device, sending of image data whose size exceeds a processing capacity to the adaptation unit or the multiplexing layer unit can be prevented and a delimitation on a data unit basis can be maintained to enable the data to be properly handled.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a table showing a difference in processing between the multiplexing device according to the present embodiment and a conventional common multiplexing device.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Modes for implementing the present invention will be described in detail with reference to the drawings.

Figure 1:
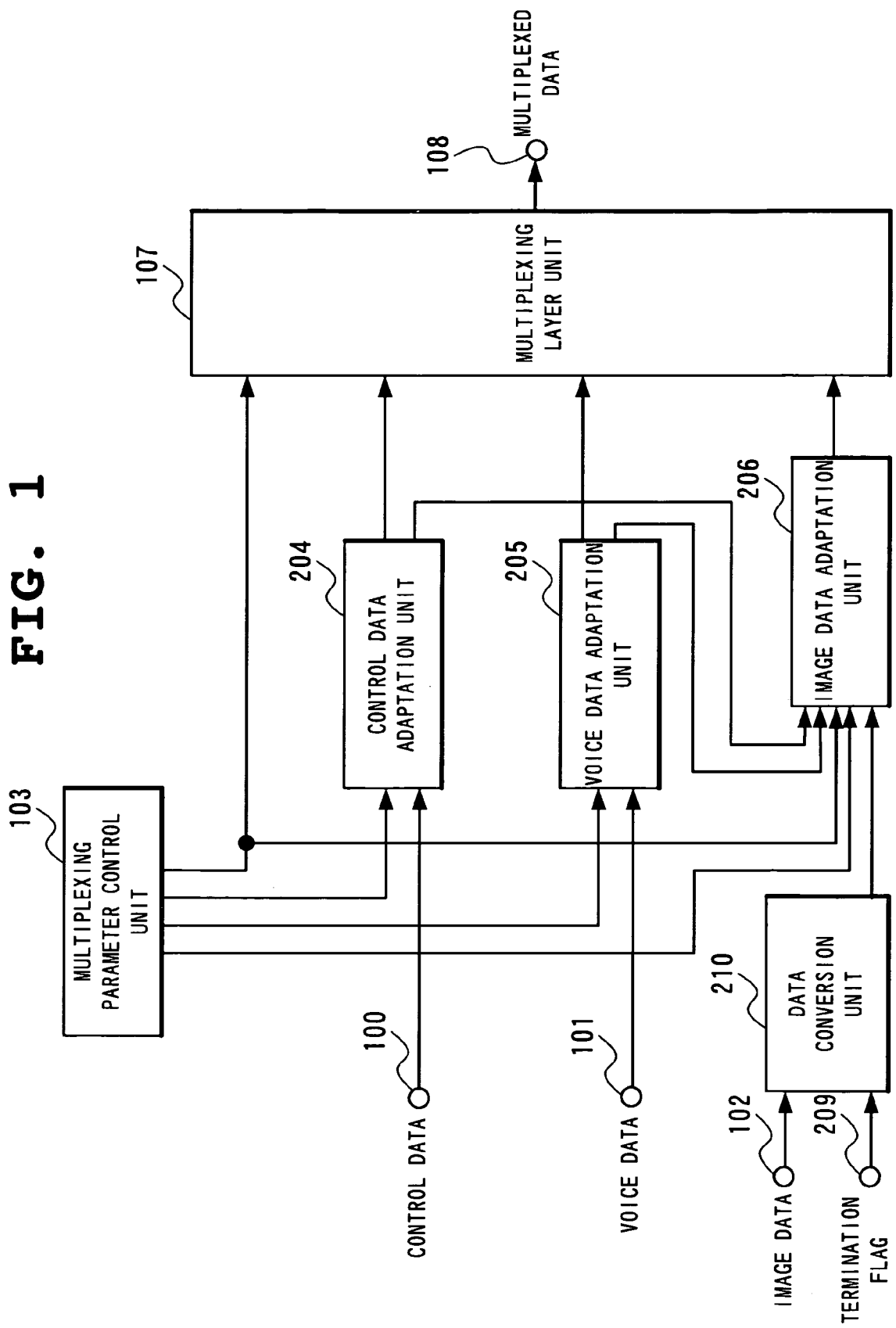
FIG. 1 is a block diagram showing a structure of a multiplexing device according to one embodiment of the present invention.

FIG. 1 is a block diagram showing a structure of a multiplexing device according to one embodiment of the present invention. With reference to FIG. 1, the multiplexing device of the present embodiment includes a multiplexing parameter control unit 103, a control data adaptation unit 204, a voice data adaptation unit 205, an image data adaptation unit 206, a multiplexing layer unit 107 and a data conversion unit 210.

The multiplexing device according to the present embodiment is a device which multiplexes coded image and voice into a single stream. Applied to the present multiplexing device are the image data 102 which is a coded image, a termination flag 209 indicative of a termination of a unit of the image data 102, the voice data 101 which is coded voice and the control data 100 as control information related to a coding system or a multiplexing system of voice and images.

The control data 100 is applied to the control data adaptation unit 204, the voice data 101 is applied to the voice data adaptation unit 205 and the image data 102 and the termination flag 209 are applied to the data conversion unit 210.

The multiplexing parameter control unit 103 assigns each of the control data adaptation unit 204, the voice data adaptation unit 205 and the image data adaptation unit 206 a maximum AL-SDU (Adaptation Layer-Service Data Unit) size.

AL-SDU is an SDU of an adaptation layer and a maximum AL-SDU size is a parameter which specifies a maximum size of an AL-SDU.

Assume that a maximum AL-SDU size of the control data adaptation unit 204 is denoted as a maximum AL1-SDU size, a maximum AL-SDU size of the voice data adaptation unit 205 is denoted as a maximum AL2-SDU size and a maximum AL-SDU size of the image data adaptation unit 206 is denoted as a maximum AL3-SDU size.

The multiplexing parameter control unit 103 assigns the multiplexing layer unit 107 and the image data adaptation unit 206 a maximum MUX-PDU (Multiplex-Protocol Data Unit) size.

MUX-PDU is a PDU in a multiplexed layer and a maximum MUX-PDU size is a parameter which specifies a maximum size of an MUX-PDU.

The control data adaptation unit 204, the voice data adaptation unit 205 and the image data adaptation unit 206 provide a function of an adaptation layer according to properties of each data.

The control data adaptation unit 204 generates an AL1-PDU as an AL-PDU (Adaptation Layer-Protocol Data Unit) which stores applied control data 100 and sends the same to the multiplexing layer unit 107.

At this time, when the size of the applied control data 100 is equal to or smaller than the maximum AL1-SDU size, the control data adaptation unit 104 takes the control data 100 as an AL-SDU (AL1-SDU) without processing.

When the size of the control data 100 is larger than the maximum AL1-SDU size, the control data adaptation unit 104 segments the control data 100 on a maximum AL1-SDU size basis to take each segmented data as the AL1-SDU. As to the control data, no additional information exists, so that the AL1-SDU is as it is taken as the AL1-PDU.

Then, the control data adaptation unit 204 sends the AL1-PDU to the multiplexing layer unit 107, as well as notifying the image data adaptation unit 206 of the AL1-PDU size indicative of the size of the AL1-PDU.

The voice data adaptation unit 205 generates an AL2-PDU as an AL-PDU which stores applied voice data 101 and sends the same to the multiplexing layer unit 107.

At this time, when the size of the applied voice data 101 is equal to or smaller than the maximum AL2-SDU size, the voice data adaptation unit 204 takes the voice data 101 as an AL-SDU (AL2-SDU) without processing.

On the other hand, when the size of the voice data 101 is larger than the maximum AL2-SDU size, the voice data adaptation unit 205 segments the voice data 101 on a maximum AL2-SDU size basis to take each segmented data as the AL2-SDU.

As to the voice data, with a sequence number and a CRC (Cyclic Redundancy Check) code attached to the AL2-SDU as required, the data is generated as the AL2-PDU. Sequence number to be attached is a number indicative of the order of data. CRC code is a code for use in detecting a bit error.

Then, the voice data adaptation unit 204 sends the AL2-PDU to the multiplexing layer unit 107, as well as notifying the image data adaptation unit 206 of an AL2-PDU size indicative of the size of the AL2-PDU.

The data conversion unit 210 segments or concatenates the applied image data 102 as required based on a predetermined limited size and the termination flag 209 and sends the obtained data to the image data adaptation unit 206.

Limited size is a maximum size of image data which can be handled by the multiplexing device, which is derived from constraints on hardware or the like of the multiplexing device.

Image data is applied to the multiplexing device on a VP (Video Packet) basis in general, or when a VP size exceeds a limit, it is applied on a divided VP basis.

When the end of the input image data 102 is the termination of the VP, the value of the termination flag 209 is "1" and unless the end of the image data 102 is the termination of the VP, the value of the termination flag is "0".

The data conversion unit 210 executes processing of segmenting or concatenating the image data 102 to prevent input of the image data 102 whose size exceeds a predetermined limited size to the image data adaptation unit 206 and to delimit the image data by a delimitation of the VP based on the termination flag 209.

Figure 2:
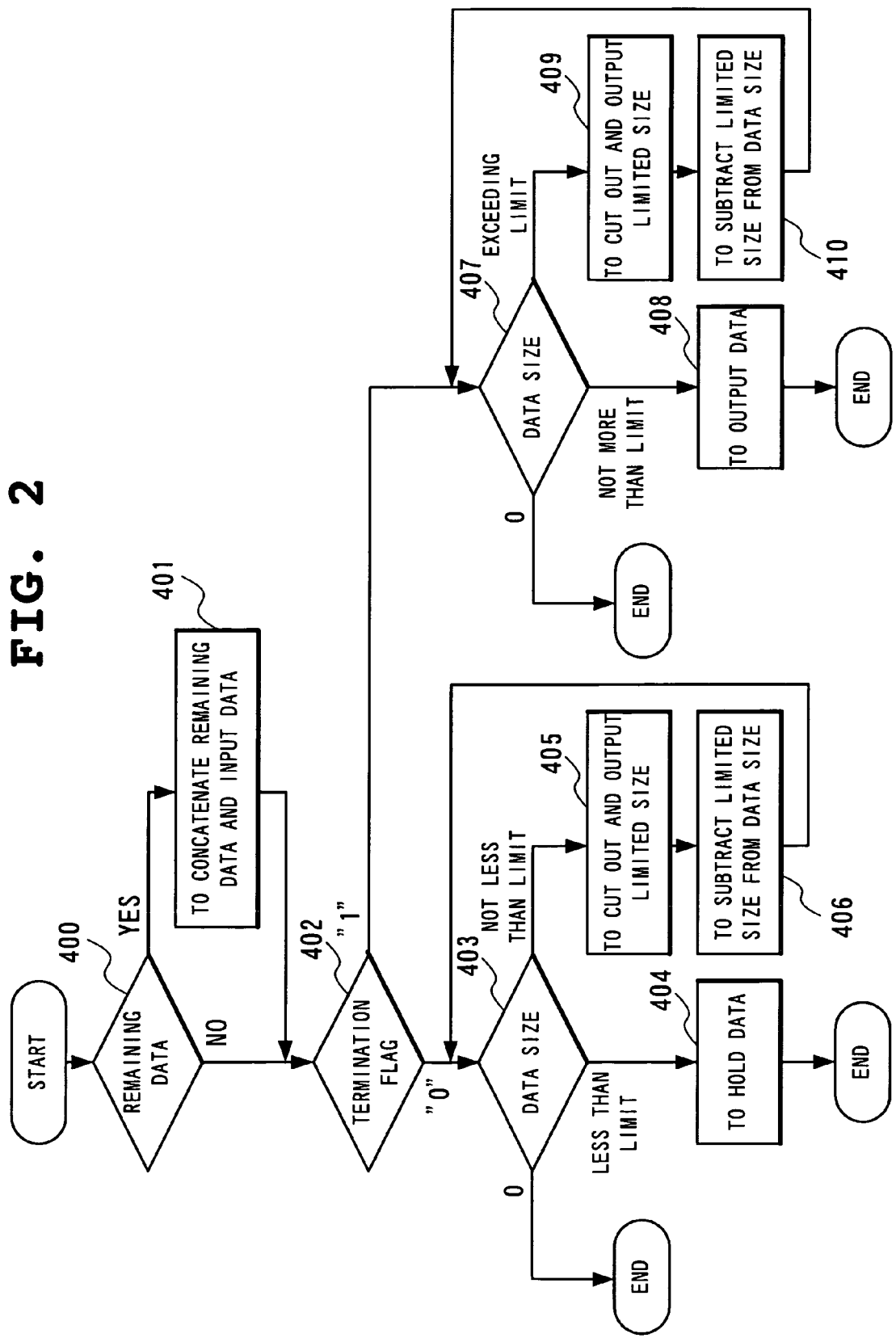
FIG. 2 is a flow chart showing operation of a data conversion unit.

FIG. 2 is a flow chart showing operation of the data conversion unit.

Since data held in preceding processing (hereinafter referred to as "remaining data") might exist in the data conversion unit 210, when the image data 102 is applied, the data conversion unit 210 first determines whether there exists remaining data or not (Step 400). When there exists remaining data, the data conversion unit 210 concatenates the remaining data before the input image data 102 (Step 401).

When the determination is made at Step 400 that there exists no remaining data, or when the processing of Step 401 ends, the data conversion unit 210 next makes determination of the termination flag 209 (Step 402).

When the termination flag is "0", that is, unless it is the end of the VP, the data conversion unit 210 determines whether the image data 102 is not less than a limited size, or it is more than zero and less than the limited size, or zero (Step 403). When the size of the image data 102 is zero, the data conversion unit 210 ends the processing without further processing.

When the size of the image data 102 is larger zero and less than the limited size, hold the image data as remaining data to end the processing (Step 404).

When the size of the image data 102 is larger than the limited size, the data conversion unit 210 cuts out an equivalence to the limited size from the top of the image data 102, outputs the cut-out data to the image data adaptation unit 206 (Step 405) and subtracts the limited size from the data size (Step 406) to return the processing to Step 403.

On the other hand, when the determination is made at Step 402 that the termination flag is "1", that is, the end of the data is the termination of the VP, the data conversion unit 210 determines whether the image data 102 is larger than the limited size, or it is larger than zero and not more than the limited size, or it is zero (Step 407). When the size of the image data 102 is zero, the data conversion unit 210 ends the processing without further processing.

When the size of the image data 102 is larger than zero and not more than the limited size, output the image data to the image data adaptation unit 206 to end (Step 408).

When the size of the image data 102 exceeds the limited size, the data conversion unit 210 cuts out an equivalence to the limited size from the top of the image data 102, sends the cut-out data to the image data adaptation unit 206 (Step 409) and subtracts the limited size from the data size (Step 410) to return the processing to Step 407.

The image data adaptation unit 206 generates an AL-DPU (AL3-PDU) which stores the image data 102 from the data conversion unit 210 and sends the same to the multiplexing layer unit 107.

At this time, the image data adaptation unit 206 obtains an appropriate size of the AL3-PDU based on the AL1-PDU size from the control data adaptation unit 204, the AL2-PDU size from the voice data adaptation unit 205 and the maximum AL3-SDU size from the multiplexing parameter control unit 103.

Figure 3:
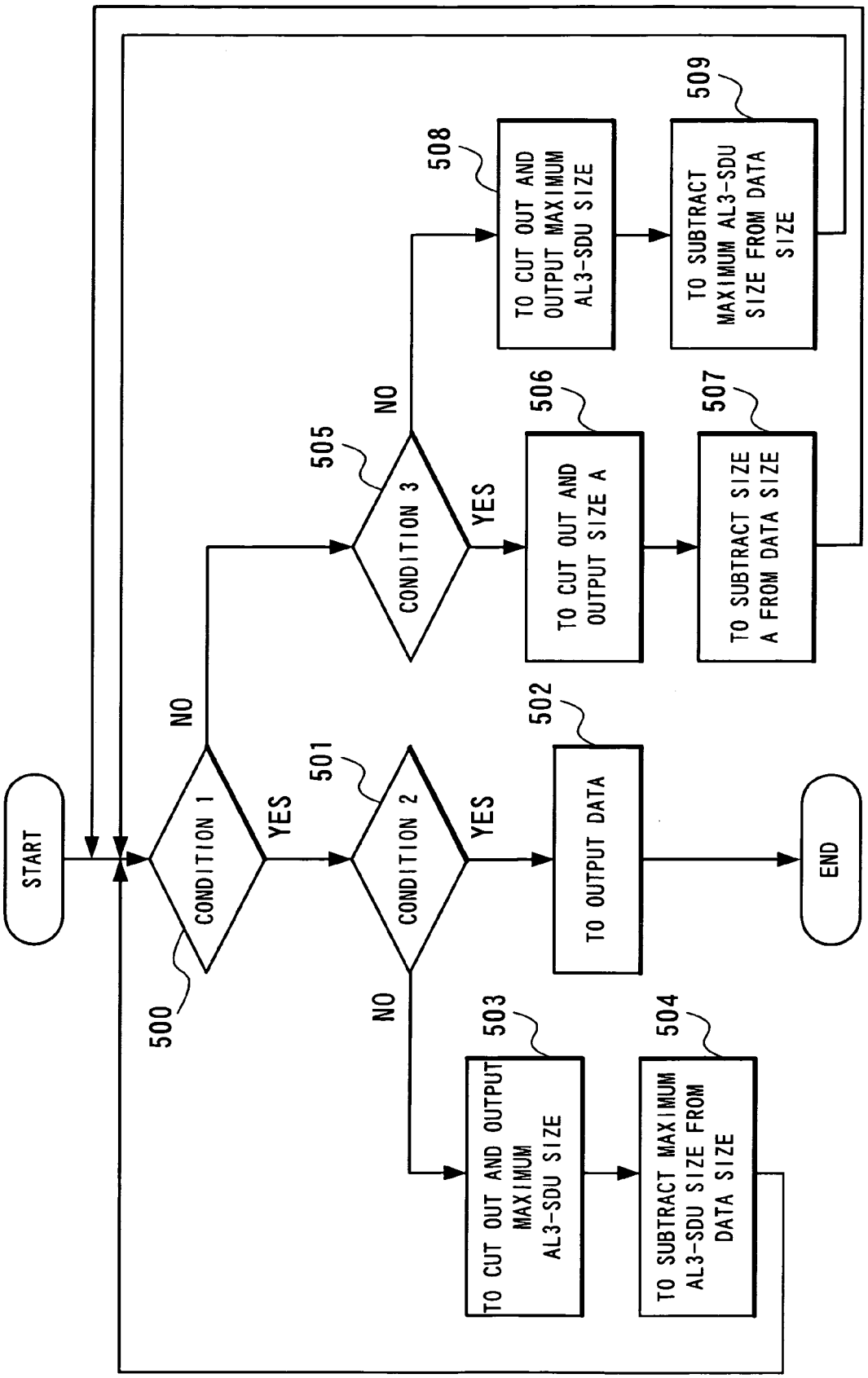
FIG. 3 is a flow chart showing operation of an image data adaptation unit.

FIG. 3 is a flow chart showing operation of the image data adaptation unit 206.

With reference to FIG. 3, the image data adaptation unit 206 makes determination of Condition 1 (Step 500).

Here, the determination of Condition 1 is to determine whether with a value (size) calculated by {(maximum MUX-PDU size)−(AL1-PDU size)−(AL2-PDU size)−(AL3-SDU header size)} as "A", the data size of image data from the data conversion unit 210 is not more than "A" or not.

When the data size of the image data is not more than "A", the image data adaptation unit 206 next makes determination of Condition 2 (Step 501).

Here, the determination of Condition 2 is to determine whether a data size is not more than the maximum AL3-SDU size or not.

When the data size is not more than the maximum AL3-SDU size, the image data adaptation unit 206 sends the image data to the multiplexing layer unit 107 to end the processing (Step 502).

On the other hand, unless the data size is not more than the maximum AL3-SDU size, the image data adaptation unit 206 cuts out an equivalence to the maximum AL3-SDU size from the top of the image data to send the cut-out data to the multiplexing layer unit 107 (Step 503) and subtracts the maximum AL3-SDU size from the data size (Step 504) to return the processing to Step 500.

When sending the cut-out image data to the multiplexing layer unit 107, with the image data as the AL3-SDU, the image data adaptation unit 206 attaches an AL3-PDU header to the data and sends the obtained data as the AL-PDU (AL3-PDU) to the multiplexing layer unit 107.

When in the determination of Condition 1, unless the data size is not more than "A", the image data adaptation unit 206 next makes determination of Condition 3 (Step 505).

The determination of Condition 3 is to determine whether "A" is not more than the maximum AL3-SDU size or not.

When "A" is not more than the maximum AL3-SDU size, the image data adaptation unit 206 cuts out an equivalence to A from the top of the image data to send the cut-out data to the multiplexing layer unit 107 (Step 506) and subtracts A from the data size (Step 507) to return the processing to Step 500.

Unless "A" is not more than the maximum AL3-SDU size, the image data adaptation unit 206 cuts out an equivalence to the maximum AL3-SDU size from the top of the image data to send the cut-out data to the multiplexing layer unit 107 (Step 508) and subtracts the maximum AL3-SDU size from the data size (Step 509) to return the processing to Step 500.

The multiplexing layer unit 107 multiplexes the AL1-PDU from the control data adaptation unit 204, the AL2-PDU from the voice data adaptation unit 205 and the AL3-PDU from the image data adaptation unit 206 and attaches an MUX-PDU header to the multiplexed data to generate a MUX-PDU and output the same as the multiplexed data 108. With a plurality of multiplexing tables for use in multiplexing prepared in advance, the multiplexing layer unit 107 uses any of the multiplexing tables for the multiplexing processing.

MUX-PDU header is formed of a PM (Packet Marker), an MC (Multiplex Code) and an HEC (Header Error Control). PM indicates whether a last byte of an AL-SDU is included or not. MC indicates a multiplexing table used. HEC is information for detecting an error of an MUX-PDU header.

In addition, the multiplexing layer unit 107 has a function of segmenting an AL-PDU as required at that time such that the size of an MUX-PDU is within a maximum MUX-PDU size. However, since the AL3-PDU from the image data adaptation unit 206 already has a size taking the maximum MUX-PDU size into consideration, no segmentation of an AL-PDU is executed at the multiplexing layer unit 107 at an ordinary state.

As described in the foregoing, according to the present embodiment, since the data conversion unit 210 segments or concatenates input image data such that the image data fails to exceed a predetermined limited size and such that the data is delimited by a delimitation of a VP and sends the obtained data to the image data adaptation unit 206, even when data of a large size is applied to the multiplexing device, sending of image data whose size exceeds a processing capacity to the image data adaptation unit 206 or the multiplexing layer unit 107 can be prevented and a delimitation of a VP can be maintained to enable large image data to be properly handled.

Here, description will be made of a difference in processing between the multiplexing device according to the present embodiment and a conventional common multiplexing device with respect to a specific application example.

FIG. 4 is a table showing a difference in processing between the multiplexing device according to the present embodiment and a conventional common multiplexing device.

Assume here that the maximum AL1-SDU size, the maximum AL2-SDU size and the maximum AL3-SDU size are all 200 bytes and the maximum MUX-PDU size is 160 bytes.

Also assume that in an adaptation layer, no AL1-PDU header exists, the AL2-PDU header has one byte and the AL3-PDU header has two bytes and in a multiplexed layer, the MUX-PDU header has one byte.

Also assume that in the multiplexing layer unit 107, two multiplexing tables T1 and T2 are prepared. With logical channels assigned to control data, voice data and image data as LCN0, LCN1 and LCN2, respectively, the multiplexing table T1 is defined to have first the LCN0 of 10 bytes, next LCN1 of 33 bytes and then the LCN2 within a range of the maximum MUX-PDU size. In addition, the multiplexing table T2 is defined to have only the LCN2 arranged within a range of the maximum MUX-PDU size.

Then, assume that sizes of the applied control data 100, voice data 101 and image data 102 are 10 bytes, 32 bytes and 240 bytes, respectively.

In a conventional multiplexing device, the AL1-PDU of 10(10+0) bytes, the AL2-PDU of 33(32+1) bytes and two AL3-PDU of 202(200+2) bytes and 42(40+2) bytes are generated in an adaptation layer.

In a multiplexed layer, an MUX-PDU including control data and voice data is generated by using the multiplexing table T1. At this time, 116 bytes are cut out from the AL3-PDU having 202 bytes so as not to exceed the maximum MUX-PDU size. Using the multiplexing table T2, an MUX-PDU of 87(86+1) bytes including image data having the remaining 86 bytes from which data 116 bytes have been cut out and an MUX-PDU of 43(42+1) bytes including image data of 42 bytes are generated.

On the other hand, with the multiplexing device according to the present embodiment, generated in the adaptation layer are the AL1-PDU of 10(10+0) bytes, the AL2-PDU of 33(32+1) bytes, and two AL3-PDU of 116(114+2) bytes and 128 (126+2) bytes.

In the multiplexed layer, using the multiplexing table T1, an MUX-PDU including control data and voice data is generated. At this time, an MUX-PDU of 160 bytes is generated by the AL1-PDU of 10 bytes, the AL2-PDU of 33 byte and the AL3-PDU of 116 bytes. In addition, using the multiplexing table T2, an MUX-PDU of 129 bytes including the AL3-PDU of 128 bytes is generated.

As described in the foregoing, while three MUX-PDUs are generated in a conventional multiplexing device, two MUX-PDUs are generated in the multiplexing device according to the present embodiment. As a result, while a total number of bytes is 290 in the conventional device, it is 289 bytes in the present embodiment. In other words, it can be found that the less the number of MUX-PDU headers becomes to have more unnecessary MUX-PDUs, the more multiplexing efficiency is improved.

Although illustrated here is a case where the MUX-PDU header has one byte, the number of bytes of an MUX-PDU header will be increased in a system having improved transmission path error resistance. There exists, for example, a system in which an MUX-PDU header is expanded to have four bytes. There further exists a system in which a four-byte flag is inserted in order to discriminate a delimitation of an MUX-PDU. Using these two systems will bring more effects of improving transmission efficiency in the present embodiment.

In FIG. 4, shown as the total number of bytes of the MUX-PDU indicated in parentheses with respect to the conventional multiplexing device and the multiplexing device according to the present embodiment are total numbers of bytes when using the above-described two systems, in which the conventional device has 311 bytes, while the present embodiment has 303 bytes to find that multiplexing efficiency is more improved.

In a conventional multiplexing device, since an adaptation layer and a multiplexed layer each segment data based on applied parameters, segmentation is made with low efficiency. According to the present embodiment, however, at the time of segmenting the AL3-PDU of image data in an adaptation layer, an appropriate size is cut out based on the AL1-PDU size of control data, the AL2-PDU size of voice data and the maximum MUX-PDU size of a multiplexed layer, so that multiplexing efficiency can be improved.

Another embodiment of the present invention will be described.

Figure 5:
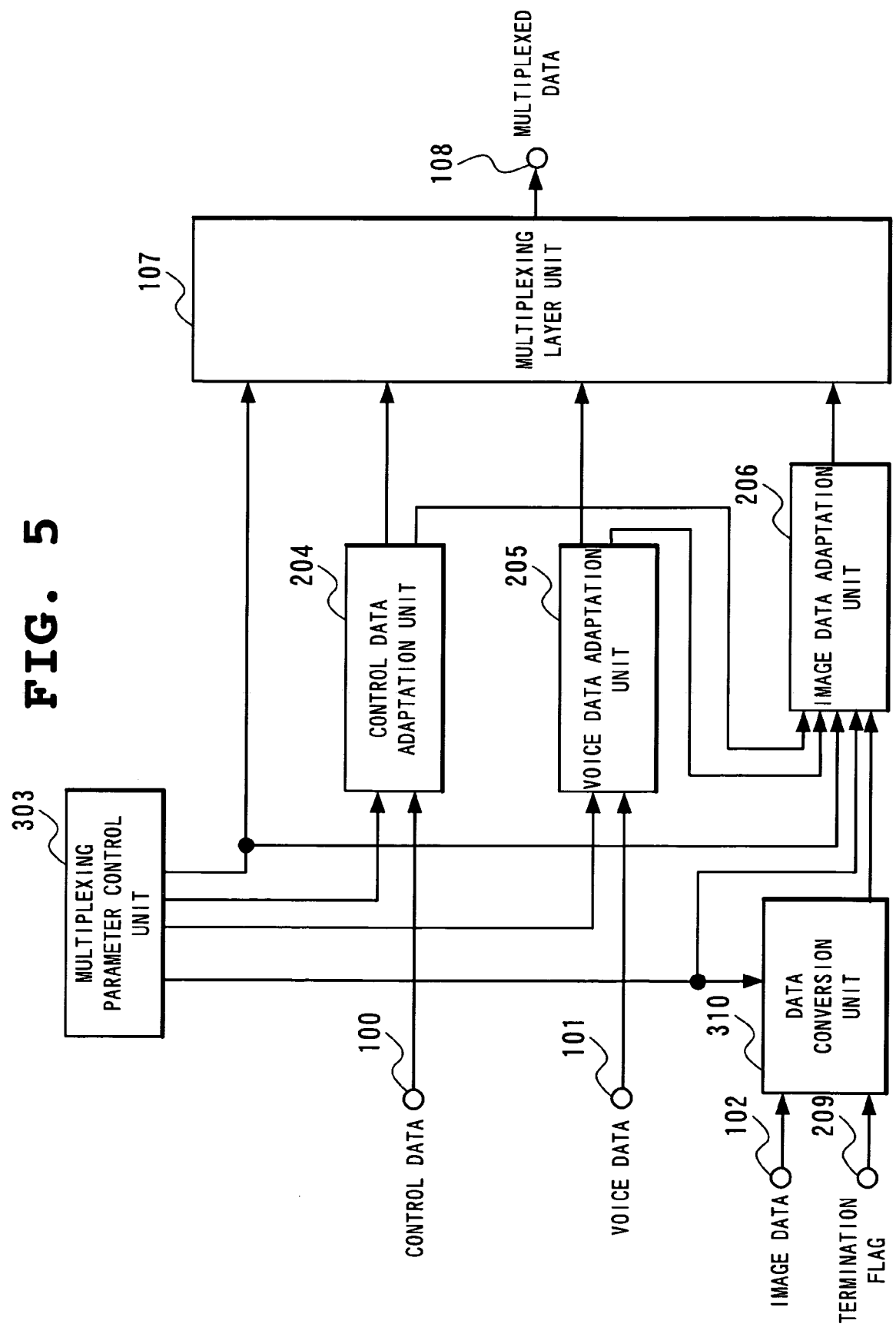
FIG. 5 is a block diagram showing a structure of a multiplexing device according to another embodiment of the present invention.
Figure 6:
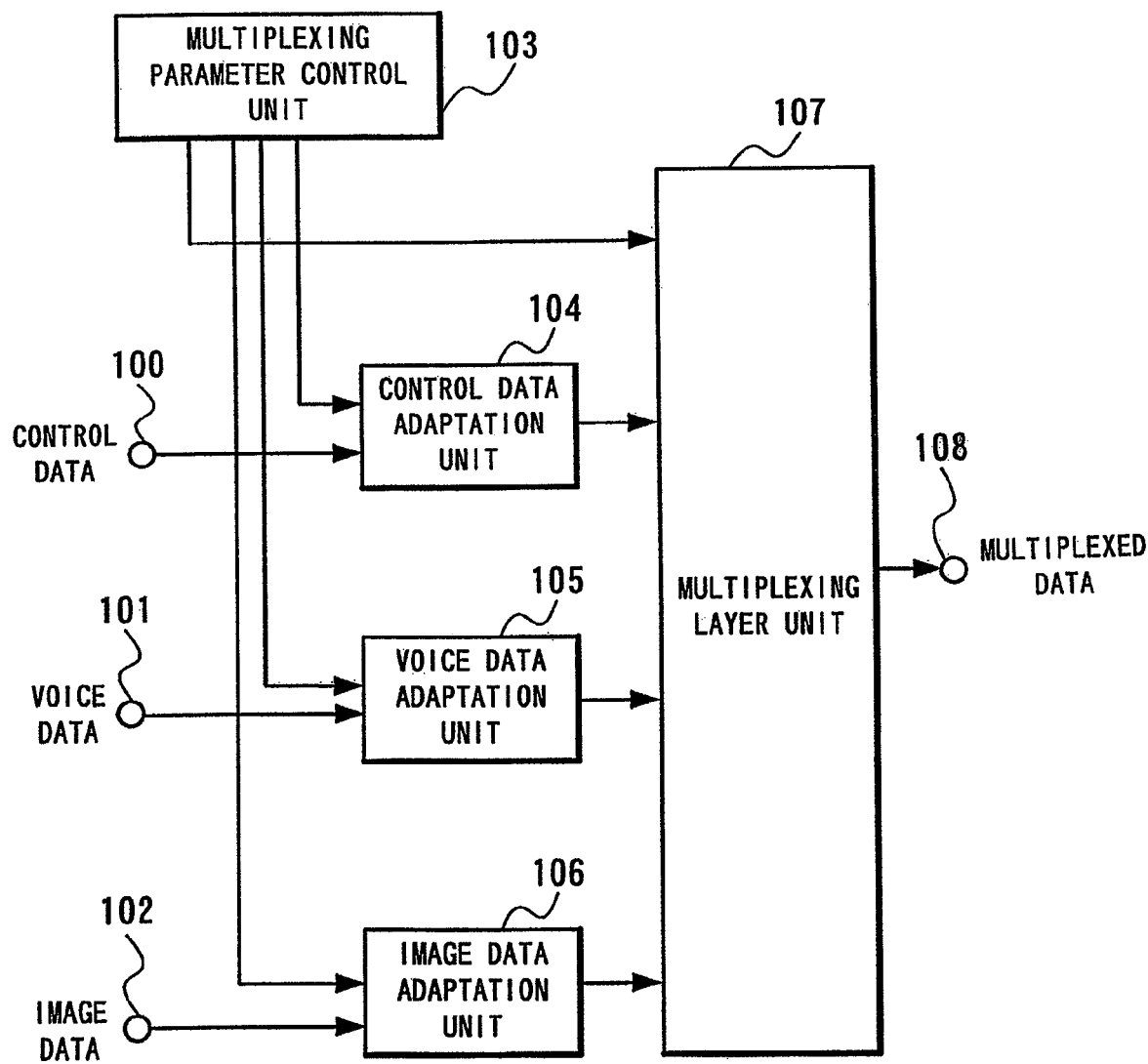
FIG. 6 is a block diagram showing a structure of a common multiplexing device.

FIG. 5 is a block diagram showing a structure of a multiplexing device according to another embodiment of the present invention. With reference to FIG. 5, the multiplexing device includes a multiplexing parameter control unit 303, the control data adaptation unit 204, the voice data adaptation unit 205, the image data adaptation unit 206, the multiplexing layer unit 107 and a data conversion unit 310.

Similarly to that shown in FIG. 1, the present embodiment relates to a device which multiplexes coded image and voice into a single stream. Applied to the present multiplexing device are the image data 102 as a coded image, the termination flag 209 indicative of a termination of a unit of the image data 102, the voice data 101 as coded voice and the control data 100 as control information related to a coding system or a multiplexing system of voice and images.

In the present embodiment, the control data adaptation unit 204, the voice data adaptation unit 205, the image data adaptation unit 206 and the multiplexing layer unit 107 are the same as those illustrated in FIG. 1. On the other hand, the multiplexing parameter control unit 303 and the data conversion unit 310 are different from those shown in FIG. 1.

Although the multiplexing parameter control unit 303 operates similarly to the multiplexing parameter control unit 103 shown in FIG. 1, it differs in giving the maximum AL3-SDU as a parameter for the image data adaptation unit 206 also to the data conversion unit 310.

Although the data conversion unit 310 operates in a manner as illustrated in FIG. 2 similarly to the data conversion unit 210 shown in FIG. 1, it differs in using the maximum AL3-SDU given by the multiplexing parameter control unit 303 or a value of a positive integral multiple of the same as a limited size at Steps 403 and 407 in FIG. 2.

According to the present embodiment, the data conversion unit 310 adjusts the applied image data 102 to have the maximum AL3-PDU size as a limited size or a positive integral multiple of the same and sends the adjusted data to the image data adaptation unit 206.

Since the image data adaptation unit 206 uses the maximum AL3-PDU size for cutting out data as shown in the operation illustrated in FIG. 3, segmentation into the AL3-PDU is more efficiently executed to improve multiplexing efficiency.

As described in the foregoing, according to the present invention, since the data conversion unit segments or concatenates applied data such that the data fails to exceed a predetermined limited size and such that the data is delimited by a delimitation of a data unit and sends the obtained data to the adaptation unit, even when data of a large size is applied to the multiplexing device, sending of image data whose size exceeds a processing capacity to the adaptation unit or the multiplexing layer unit can be prevented and a delimitation on a data unit basis can be maintained to enable the data to be properly handled.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A multiplexing device that multiplexes a plurality of pieces of data, comprising:
    a data conversion unit that segments or concatenates at least one of the plurality of pieces of data to output converted data that is not larger than a predetermined limited size and is delimited into a predetermined data unit;
    a plurality of adaptation units comprising an image data adaptation unit arranged in parallel that adapts the plurality of pieces of data and the converted data with an adaptation layer; and
    a multiplexing layer unit that multiplexes the adapted data to output multiplexed data,
    wherein when the at least one of the plurality of pieces of data is image data and is not terminated as a predetermined data unit and is larger than the predetermined limited size, the data conversion unit segments the at least one of the plurality of pieces of image data by the predetermined limited size to output the converted data and when the size of remaining data is smaller than the predetermined limited size, the data conversion unit holds the remaining data without outputting the remaining data,
    wherein when the at least one of the plurality of pieces of data is the image data and is not terminated as the predetermined data unit and is smaller than the predetermined limited size, the data conversion unit holds the at least one of the plurality of pieces of image data as remaining data without outputting the remaining data,
    wherein when the at least one of the plurality of pieces of data is larger than a preset first maximum size, the plurality of adaptation units trim the at least one of the plurality of pieces of data by the first maximum size and output the trimmed data as an adaptation layer function, and
    wherein when a third maximum size, obtained by subtracting a size of adapted data from other than the image data adaptation unit of the plurality of adaptation units and a size of a header attached by the multiplexing layer unit from a second maximum size of the output data of the multiplexing layer unit, is equal to or less than the first maximum size, the image data adaptation unit trims the at least one of the plurality of pieces of data by the third maximum size as an adaptation layer function.

2. The multiplexing device as set forth in claim 1, wherein when the at least one of the plurality of pieces of data is terminated as the predetermined data unit and is smaller than the predetermined limited size, the data conversion unit outputs the converted data without segmenting or concatenating the at least one of the plurality of pieces of data.

3. The multiplexing device as set forth in claim 1, wherein when the at least one of the plurality of pieces of data is terminated as the predetermined data unit and is larger than the predetermined limited size, the data conversion unit segments the at least one of the plurality of pieces of data by the predetermined limited size to output converted data up to a part that includes the termination.

4. The multiplexing device as set forth in claim 1, wherein the data conversion unit concatenates the remaining data with another at least one of said plurality of pieces of data that is image data.

5. The multiplexing device as set forth in claim 1, wherein the first maximum size or a positive integral multiple of the first maximum size is the predetermined limited size.

6. The multiplexing device as set forth in claim 1, wherein the plurality of pieces of data comprises the image data, voice data, and control data, and the data conversion unit converts the image data.

7. The multiplexing device as set forth in claim 6, wherein the predetermined data unit is a Video Packet.

8. A data processing method of a multiplexing device that multiplexes a plurality of pieces of data, comprising:
    converting at least one of the plurality of pieces of data by segmenting or concatenating the at least one of the plurality of pieces of data to output converted data which is not larger than a predetermined limited size and is delimited as a predetermined data unit;
    adapting, by a plurality of adaptation units comprising an image data adaptation unit, the plurality of pieces of data and the converted data with an adaptation layer; and
    multiplexing the adapted data to output multiplexed data,
    wherein when the at least one of the plurality of pieces of data is image data and is not terminated as a predetermined data unit and is larger than the predetermined limited size, said converting segments the at least one of the plurality of pieces of image data by the predetermined limited size to output the converted data and when the size of the remaining data is smaller than the predetermined limited size holds the remaining data,
    wherein when the at least one of said plurality of pieces of data is the image data and is not terminated as a predetermined data unit and is smaller than the predetermined limited size, said converting holds the at least one of the plurality of pieces of image data as remaining data without outputting the remaining data,
    wherein when the at least one of the plurality of pieces of data is larger than a preset first maximum size, said adapting trims the at least one of the plurality of pieces of data by the first maximum size and outputs the trimmed data as an adaptation layer function, and wherein when a third maximum size, obtained by subtracting a size of adapted data from other than the image data adaptation unit of the plurality of adaptation units and a size of a header attached by the multiplexing from a second maximum size of the output data of the multiplexing, is equal to or less than the first maximum size, said adapting trims, by the image data adaptation unit, the at least one of the plurality of pieces of data by the third maximum size as an adaptation layer function.

9. The data processing method of a multiplexing device as set forth in claim 8, wherein the converting does not segment or concatenate the at least one of the plurality of pieces of data when the at least one of the plurality of pieces of data is terminated as the predetermined data unit and is smaller than the predetermined limited size.

10. The data processing method of a multiplexing device as set forth in claim 8, wherein the converting includes segmenting the at least one of the plurality of pieces of data when the at least one of said plurality of pieces of data is terminated as the predetermined data unit and is larger than the predetermined limited size by the predetermined limited size to output converted data up to a part that includes the termination.

11. The data processing method of a multiplexing device as set forth in claim 8, wherein the converting includes concatenating the remaining data to at least one other of the plurality of pieces of data.

12. The data processing method of a multiplexing device as set forth in claim 8, wherein the plurality of pieces of data comprises the image data, voice data, and control data, and the image data is converted.

* * * * *